US010648998B2

(12) United States Patent
Willit et al.

(10) Patent No.: US 10,648,998 B2
(45) Date of Patent: *May 12, 2020

(54) AUTOMATED INVENTORY CONTROL SYSTEM USING PIVOTABLE DIVIDER

(71) Applicant: LogiQuip LLC, Galesburg, MI (US)

(72) Inventors: Aaron J. Willit, Galesburg, MI (US); Mark Roberts, Galesburg, MI (US)

(73) Assignee: LogiQuip LLC, Galesburg, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,399

(22) Filed: Mar. 27, 2019

(65) Prior Publication Data

US 2020/0041535 A1  Feb. 6, 2020

Related U.S. Application Data

(63) Continuation of application No. 16/052,744, filed on Aug. 2, 2018, now Pat. No. 10,482,423.

(51) Int. Cl.
| | |
|---|---|
| G06Q 30/00 | (2012.01) |
| G01P 13/00 | (2006.01) |
| G08B 5/36 | (2006.01) |
| G06Q 30/06 | (2012.01) |
| G06Q 10/08 | (2012.01) |

(52) U.S. Cl.
CPC ............ *G01P 13/00* (2013.01); *G06Q 10/087* (2013.01); *G06Q 30/0633* (2013.01); *G08B 5/36* (2013.01)

(58) Field of Classification Search
CPC ................................................ G06Q 30/06–08

USPC ............................................... 705/26.1–27.2
See application file for complete search history.

(56) References Cited

U.S. PATENT DOCUMENTS

| | | |
|---|---|---|
| 5,671,362 A | 9/1997 | Cowe et al. |
| 7,737,858 B2 | 6/2010 | Matityaho |
| 8,242,914 B2 | 8/2012 | Matityaho et al. |
| 8,442,878 B2 | 5/2013 | Henry |
| 8,823,521 B2 | 9/2014 | Overhultz et al. |
| 8,938,396 B2 | 1/2015 | Swafford, Jr. et al. |
| 9,208,468 B2 | 12/2015 | Olson et al. |
| 9,275,361 B2 | 3/2016 | Meyer |
| 9,326,604 B1 | 5/2016 | Schuldt et al. |
| 9,558,470 B2 | 1/2017 | Matityaho |
| 9,706,857 B2 | 7/2017 | Hardy et al. |
| 9,773,092 B2 | 9/2017 | Olson et al. |
| 2012/0043289 A1 | 2/2012 | Brown et al. |
| 2015/0026020 A1 | 1/2015 | Overhultz et al. |
| 2016/0132823 A1 | 5/2016 | Swafford et al. |

(Continued)

*Primary Examiner* — Ethan D Civan
(74) *Attorney, Agent, or Firm* — Gunther J. Evanina; Butzel Long (57) ABSTRACT

An inventory management system for automatically generating a restocking order or prompting generation of a restocking order includes a storage space, a divider pivotable on the storage space between an upright position in which the divider separates the storage space into a front storage section and a rear storage section and a recumbent position that facilitates access to the rear storage section; and a motion detector module attached to the divider, the motion detector module including a sensor for detecting pivoting of the divider and a radio frequency transmitter in communication with the accelerometer and configured to emit radio frequency signals when the divider is rotated from the upright position to the recumbent position.

21 Claims, 7 Drawing Sheets

(56) References Cited

U.S. PATENT DOCUMENTS

2017/0344935 A1 11/2017 Mattingly et al.
2018/0000259 A1* 1/2018 Cichuta .................... A47F 1/04
2018/0005175 A1 1/2018 Philippe

* cited by examiner

AUTOMATED INVENTORY CONTROL SYSTEM USING PIVOTABLE DIVIDER

CROSS REFERENCE TO RELATED APPLICATION

This application is a continuation-in-part claiming priority to U.S. application Ser. No. 16/052,744, filed Aug. 2, 2018, which is hereby incorporated by reference in its entirety.

FIELD OF THE DISCLOSURE

This disclosure relates to inventory management and more specifically to systems, apparatus and methods for automatically generating or prompting the generation of a restocking order when a user selected quantity of supplies have been removed from shelving or bins where such supplies are stored.

BACKGROUND OF THE DISCLOSURE

Items that are routinely consumed in the process of conducting business or providing services, such as in a hospital, clinic or industrial supply room are typically stored in bins or storage modules positioned on shelves, or sometimes directly on shelves. As the stock or quantity of any particular item is depleted, it is important that the stock of that particular item is replenished. This can be of critical importance in the case of medical supplies. It is desirable and customary that a reliable protocol is established for generating or prompting the generation of a restocking order well before there is risk that supplies will be completely depleted and unavailable when needed. Preferably, the restocking protocol includes apparatus that compel medical technicians or business personnel to generate or prompt generation of a restocking order when the remaining stock of any particular stored item is depleted to a predetermined quantity.

U.S. Pat. No. 9,326,604, assigned to LogiQuip, LLC, Galesburg, Mich., describes an inventory system for wire baskets or shelves, which includes a pivoting divider unit that subdivides individual bins into front and rear sections and which is pivotable between an upright position that facilitates access to items stored in the front section and a forwardly-lowered position that facilitates access to items stored in the rear section when the items in the front section are completely depleted. The divider can include a display panel that is visible when the divider is in the forwardly-lowered position and includes an indication or cue that restocking should soon occur. The indication can, for example, be a bar code that can be scanned with a reading device to detect the type of article and generate a replenishment order.

An object of this disclosure is to improve on the reliability of existing systems and reduce dependence on human participation in the process of generating a replenishment order. Another object is to incorporate apparatuses and methods that enable generation and tracking of data relating to the condition of stored items.

SUMMARY OF THE DISCLOSURE

Improved inventory control is achieved using a motion detection module that is attachable to a divider that separates a storage space into a front section having a primary supply of a particular item and a rear section having a reserve supply of the item. The divider is rotatable between an upright position that allows access to items in the front section and limits or prevents access to items in the rear section, and a recumbent position that allows access to items in the rear section when all items in the front section have been removed. Rotation of the divider to the recumbent position is detected by a sensor on the divider, which in turn causes a transmitter on the module to emit a signal indicating that restocking is needed.

DETAILED DESCRIPTION OF PREFERRED EMBODIMENTS

Figure 1:
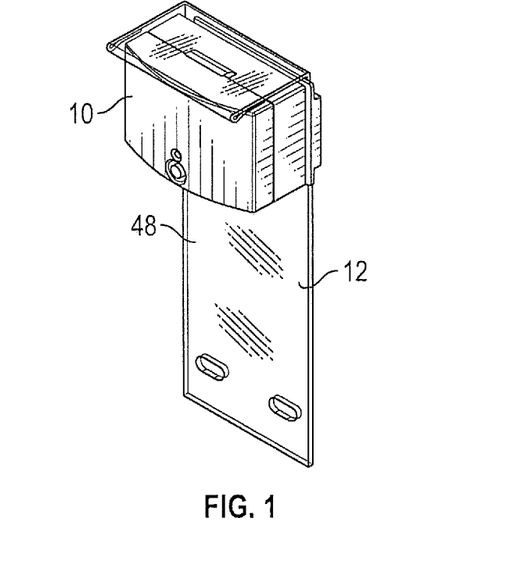
FIG. 1 is a perspective view of a motion detection module mounted on a bin divider.
Figure 2:
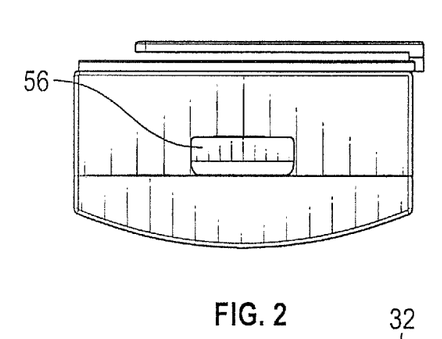
FIG. 2 is a top view of the motion detection module.
Figure 3:
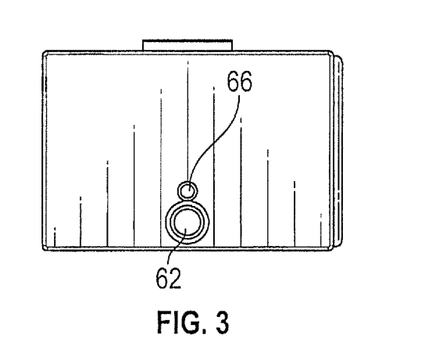
FIG. 3 is a front view of the motion detection module.
Figure 4:
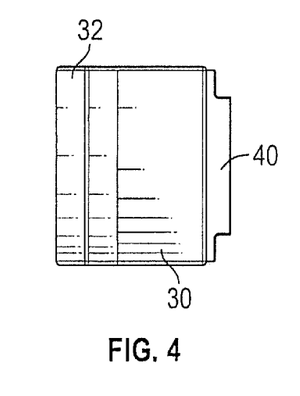
FIG. 4 is a side view of the motion detection module.
Figure 6:
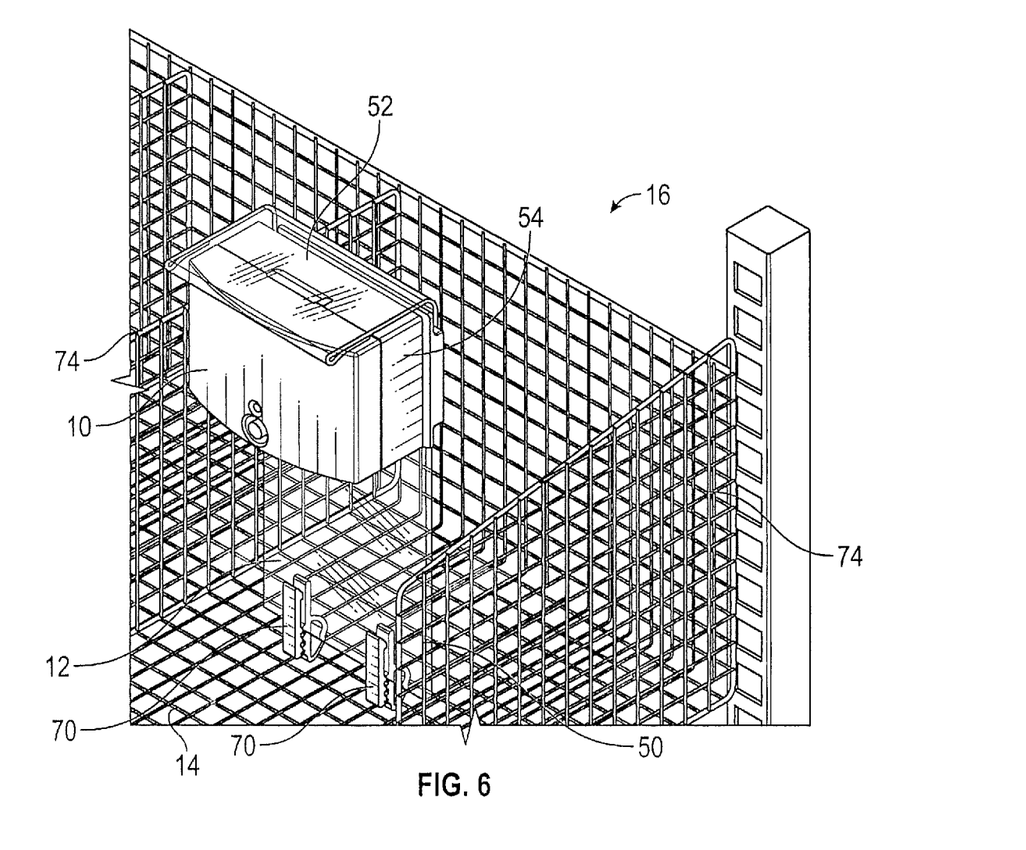
FIG. 6 is a perspective view of an inventory management system having a divider in the upright position.
Figure 7:
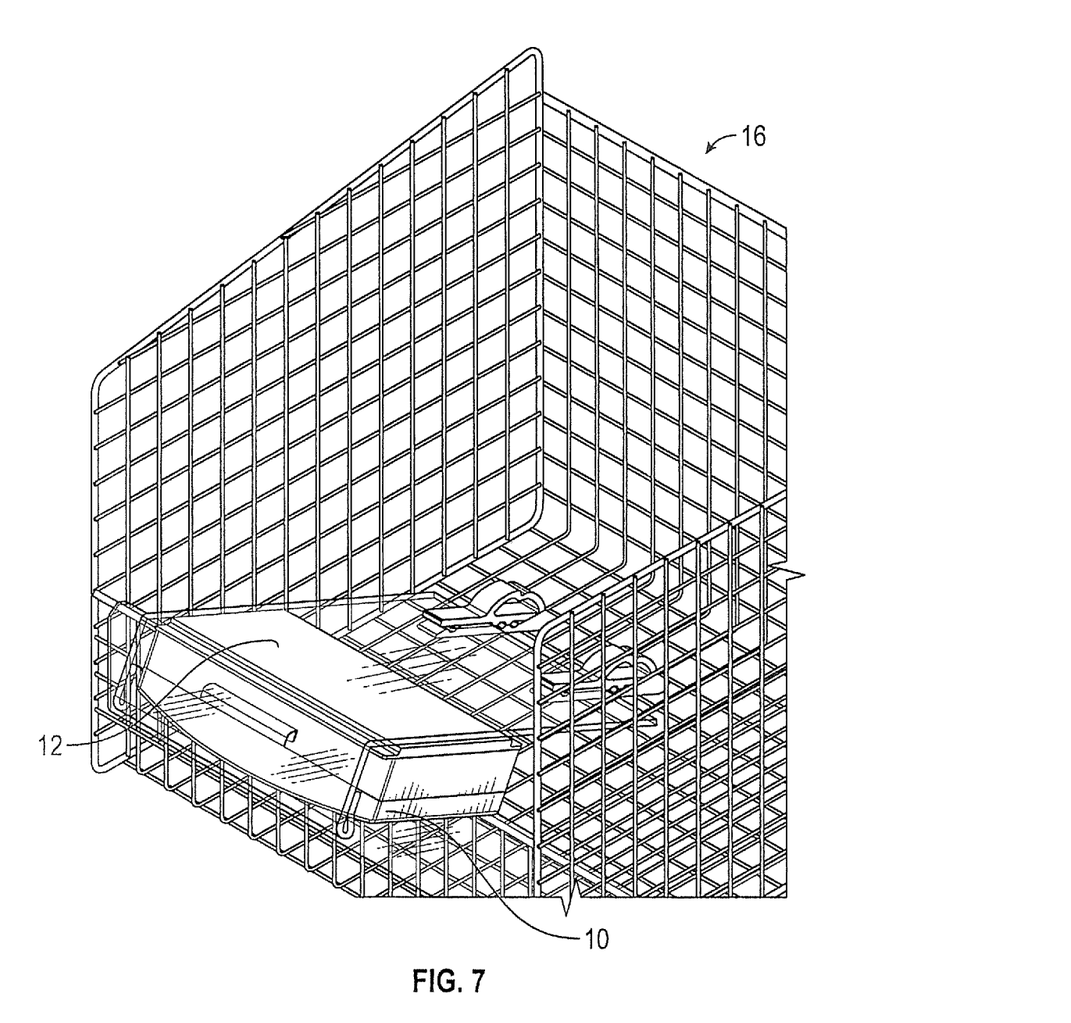
FIG. 7 is a perspective view of the inventory management system of FIG. 6 with the divider in the recumbent position.

A motion detection module 10 used in an inventory management system is shown (FIG. 1) releasably attached to a divider 12 that can be pivotably connected to a floor or bottom wall 14 of a storage space (as shown in FIGS. 6 and 7) of a storage unit 16. The storage space can, for example, be defined by a wire shelf, a wire basket, a bin, a shelf having an uninterrupted surface, or other structure capable of storing items.

Figure 5:
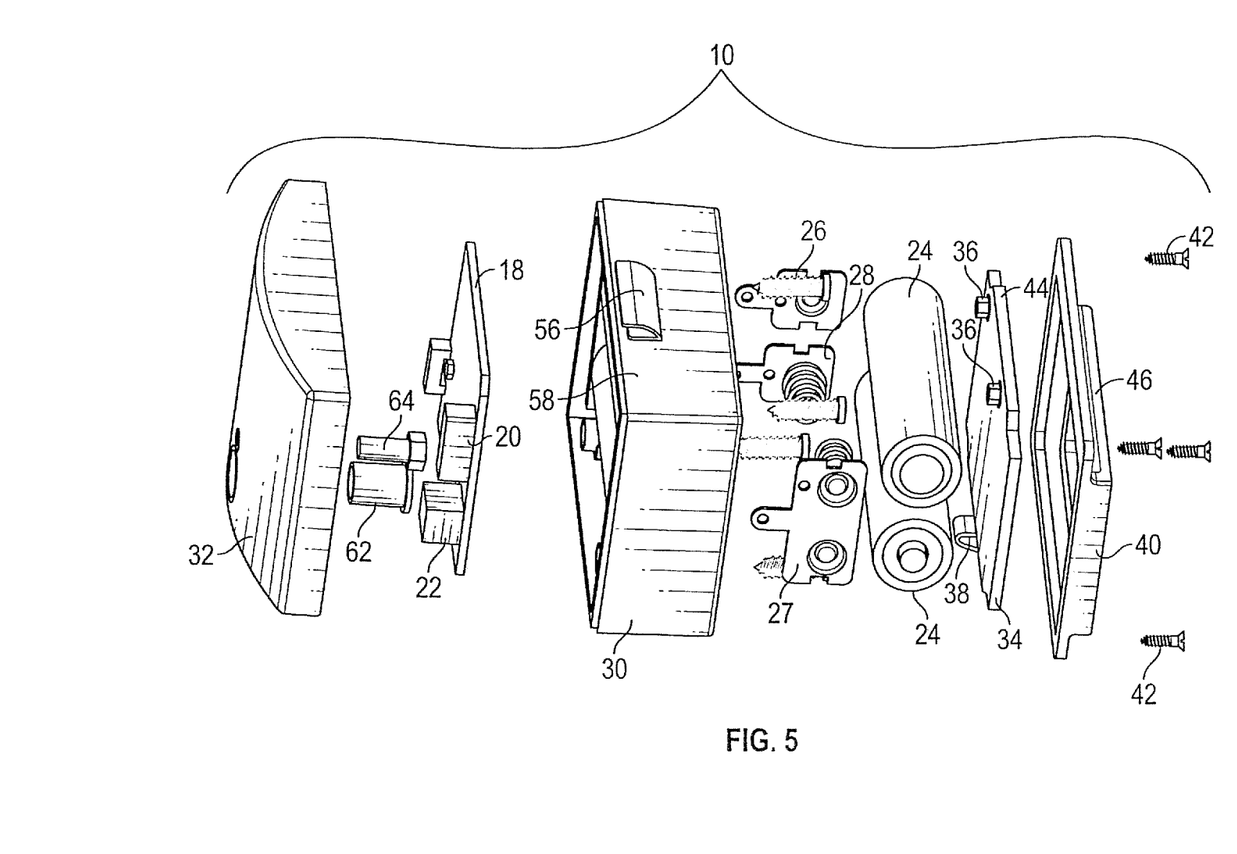
FIG. 5 is an exploded perspective illustration of the components and assembly of the motion detection module.
Figure 8:
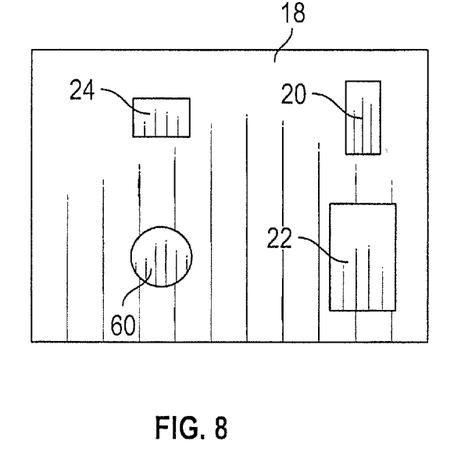
FIG. 8 is a top view of the circuit substrate and electrical components mounted on the circuit substrate.

The illustrated module 10 includes a circuit substrate 18 on which are mounted electrical components, including a sensor 20 (e.g., an accelerometer), a radio frequency transmitter 22, and a light emitting diode (LED) 24 (FIGS. 5 and 8). Other electrical components that can be incorporated on the circuit substrate include sensors (e.g., temperature or humidity sensors), and a battery voltage detector. Data from such sensors and detectors can be communicated to remote computers or system users to provide notification, for example, that stored items are at risk of being damaged by the existing conditions, or that batteries need to be changed. Circuit substrate 18 is a support structure with integrated electrical leads or conductors, such as a printed circuit board. Suitable accelerometers include miniature electromechanical devices that measure acceleration. For example, various suitable microelectromechanical systems (MEMS) based devices relying on piezoelectric, piezoresistive or capacitive effects are commercially available (e.g., LIS3DH nano-accelerometer available from STMicroelectronics, Geneva, Switzerland). Printed electrical leads (not shown) on the circuit substrate 18 provide electrical communication from accelerometer 20 to transmitter 22 to facilitate generation of a radio frequency signal when a predetermined amount of movement has been detected. Accelerometer 20 can include programmable thresholds that can be set to help ensure that a false signal is not generated such as when the divider 12 or module 10 is bumped or jolted, and not actually rotated forwardly to facilitate access to items stored rearwardly of divider 12.

Motion detection module 10 includes a power source 24 (e.g., disposable or rechargeable batteries, such as standard AAA batteries or coin type batteries), electrical contacts 26, 27, 28 for conducting electrical current from power source 24 through the circuitry and electrical components (e.g., 20, 22) on circuit substrate 18, and a housing comprised of components that may include a main housing body 30, a front cover 32 and a battery door 34 (FIGS. 2-5). Substrate 18 and components mounted thereon (e.g., accelerometer 20 and radio frequency transmitter 22), as well as power source 24 are contained within the housing. Front cover 32 and main housing body 30 can be joined together in any suitable fashion, such as with mechanical fasteners, adhesive fasteners, or interlocking features. Battery door 34 is releasably attached to main housing body 30 by tabs 36 and detent 38.

A clip 40 is attached to the housing (e.g., to main housing body 30) to facilitate releasable attachment of module 10 to a divider 12. In the illustrated embodiment, clip 40 is fastened to body 30 with screws 42. However, alternative arrangements are possible, such as attaching clip 40 to cover 34. Attachment of clip 40 to the module housing can be achieved using alternative mechanical fasteners (e.g., staples), adhesive fasteners (e.g, glue), or interlocking mechanical features. Illustrated clip 40 includes a base portion 44 that is configured to engage a front surface 48 of divider 12 and a cantilevered portion 46 that is configured to engage an opposite rear surface of divider 12. Clip 40 can be made of an injection molded resilient thermoplastic material with a gap between the base portion 44 and cantilevered portion 46 being smaller than the thickness of divider 12, such that clip 40 is capable of resiliently retaining module 10 on divider 12.

In the illustrated embodiment, module 10 is configured for releasable attachment to a divider having an inverted (upside down) L-shaped profile including a main vertical section 50 and a horizontal ledge section 52. Horizontal ledge section 52 includes a downwardly and rearwardly bent return subsection 54. A tab 56 projects from upper surface 58 of main housing body 30 to resiliently engage a gap between horizontal ledge 52 and return 54 to stabilize retention of module 10 on divider 12.

In accordance with certain preferred embodiments, an electromechanical switch 60 is provided on circuit substrate 18. Switch 60 is electrically connected to the circuitry and electrical components on substrate 18 to switch on (or off) module 10 (i.e., actuate or power the module). Switch 60 also mechanically interacts with a button actuator 62 that projects from an opening through front cover 32 of the module housing.

In accordance with certain preferred embodiments of module 10, an LED 24 is in electrical communication with the circuitry and components mounted on substrate 18 to provide a visual indication of the condition of the module. For example, the LED can emit light continuously to indicate a module "on" condition, and/or it can flash or pulse to indicate a low battery condition and/or a malfunction. A light pipe 64 can be provided to propagate light from LED 24 to an aperture 66 through front cover 32.

Module 10 can alternatively be configured differently for either permanent or releasable attachment to a divider having a structure different from that of divider 12. For example, module 10 could be configured without tab 56 and clip 40 could be rotated 90 degrees such that the bridge joining base 44 to cantilevered section 46 faces upwardly to engage a top edge of a divider having a flat profile without ledge 52 or return 54. Releasable attachment as used in this disclosure and the appending claims refers to an attachment that can be reversed without damage to any components, and can preferably be achieved without tools.

The inventory management systems 16 of this disclosure can comprise a storage bin or shelf 14 and a divider 12 that is rotatable from an upright position (as shown in FIG. 6), in which the main planar portion 50 of divider 12 acts as a wall separating a front section of the bin or shelf space from a rear section of the bin or shelf space, to a recumbent position (as shown in FIG. 7), in which the divider is positioned forwardly and downwardly from the upright position to facilitate access to items stored in the rear section of the bin or shelf space.

Figure 9:
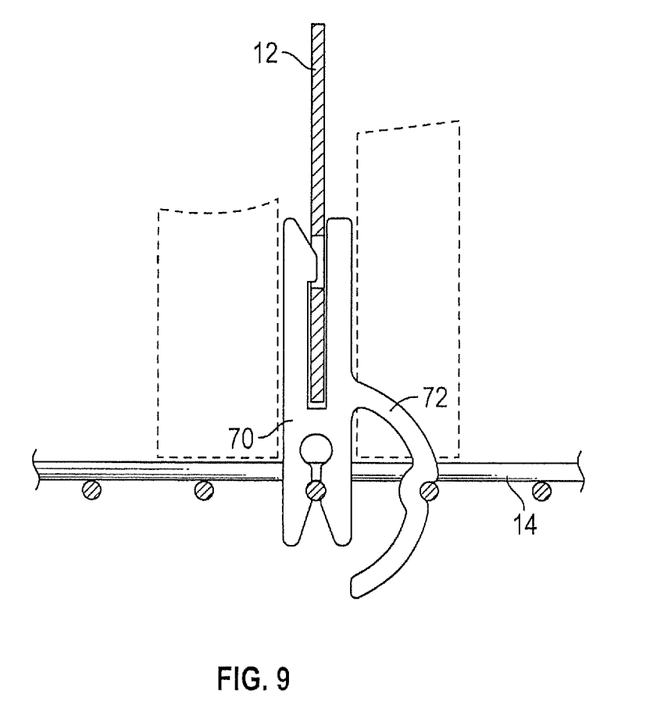
FIG. 9 is a side view showing a hinge clip that allows rotation of a divider on a floor of a wire shelf.

In the embodiment illustrated in FIGS. 6 and 7, divider 12 is rotatably joined to wires comprising the floor or bottom wall 14 of a bin or shelf of storage unit 16 by two hinges 70, which are substantially identical to the hinge units or hinge clips described in U.S. Pat. No. 9,326,604, which is incorporated in its entirety herein. Desirably, the hinge 70 includes a feature (e.g., locking member 72, FIG. 9) that provides resistance to rotation until a deliberate effort is made to rotate divider 12 to facilitate access to items in the rear section of the bin or shelf area.

As used herein the term "bin" is distinguished from shelf space based on the bin having side walls (e.g., wire walls 74), whereas a shelf space can be defined without such side walls. Shelf spaces without sidewalls can be suitable for storing certain items, such as items that store flat and/or items that can be stored in a nested arrangement.

In general, the divider is positioned so that the rear section of the bin or shelf space can accommodate a quantity of items that will not be exhausted during the time needed for restocking.

Figure 10:
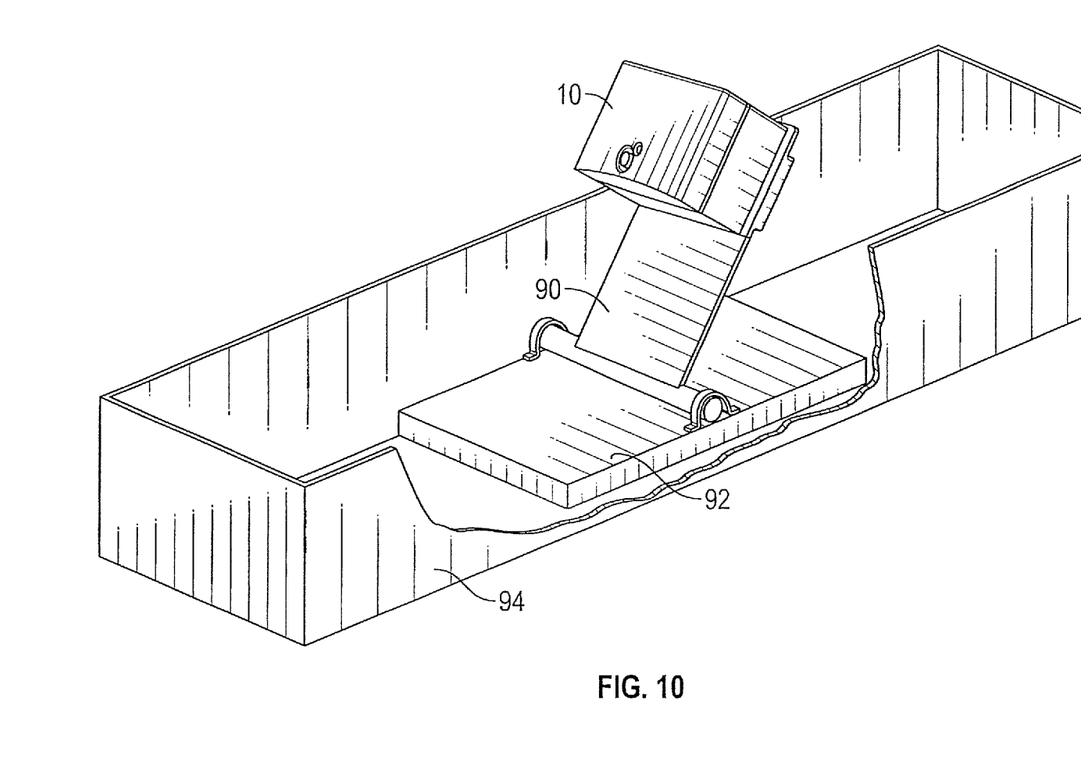
FIG. 10 is a perspective view of an alternative embodiment in which a divider is rotatably mounted on a base positioned in a bin.

FIG. 10 shows an alternate embodiment in which a divider 90 is rotatably mounted on a base 92 and placed in a bin 94 having a continuous, uninterrupted floor, side walls, back wall and front wall. Bin 94 can be placed on shelves of a storage unit.

Figure 11:
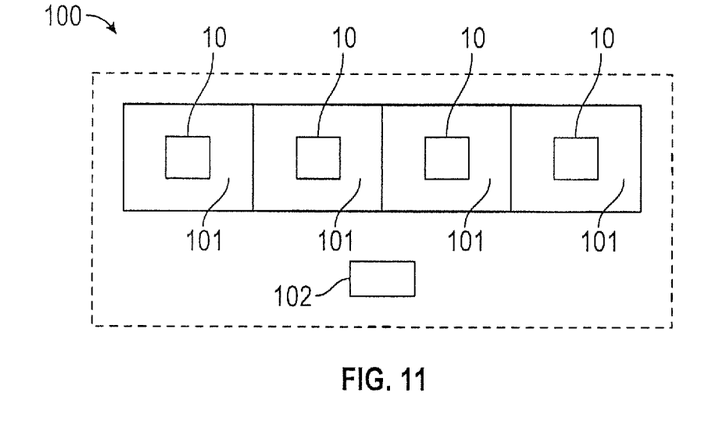
FIG. 11 is a schematic illustration of a system comprising a plurality of bins, each having a divider and an associated motion detection module.

FIG. 11 is a schematic illustration of an automated inventory control system 100 comprising a plurality of bins or shelf spaces 101. Each bin has a module 10, as described above, that is mounted on a divider 12. A single consolidator 102 can be provided to receive transmissions from modules 10 when the associated divider is rotated to the recumbent position. The individual transmitters in the modules 10 are programmed or configured to transmit a signal indicative of the item associated with that particular module. The programmed transmissions may also include additional information such as the specific location of the bin (e.g., storage unit number, shelf number, bin number, etc.). Consolidator 102 includes a radio frequency receiver for receiving transmissions from the individual modules 10, and a processor for generating restocking orders or for prompting generation of a restocking. Such orders or prompt can be communicated to a remote computer or computers via a network (e.g., a local area network, or the world wide network or Internet). Such order or prompt can include information regarding the item that needs to be restocked, the restocking quantity, and the location of the bin or shelf that needs to be restocked.

In various alternative embodiments, the accelerometer can be replaced or supplemented with a Hall-effect sensor;

a tilt switch, such as a reed switch, mercury switch, or rolling ball switch; a gyroscopic sensor; an optical sensor; or other device capable of detecting when the motion detector module and divider to which it is attached has been tilted from the upright position to the recumbent position and generating an electrical signal to initiate radio frequency communication pertaining to restocking of a storage space. In the case of a Hall-effect sensor or reed switch, a magnet could be suitably positioned on the storage space to activate the sensors when the divider is rotated to the recumbent position. The rolling ball switch is similar to the mercury switch, except that electrical contacts are closed by the rolling ball rather than a drop of mercury when the divider is tilted to the recumbent position. The optical switch could, for example, use available light (e.g., ambient light) that enters a photodetector or camera lens when the divider is in the upright position and is blocked from entering the photodetector or camera lens when the divider is in the recumbent position.

Accordingly, it is to be understood that the above description is intended to be illustrative and not restrictive. Many embodiments and applications other than the examples provided would be apparent upon reading the above description. The scope of the invention should be determined with reference to the appended claims along with the full scope of equivalents to which such claims are entitled. It is anticipated and intended that future developments will occur, and that the disclosed systems and methods will be incorporated into such future embodiments. In summary, it should be understood that the invention is capable of modification and variation.

What is claimed is:

1. An inventory management system, comprising:
   a storage space;
   a divider pivotable on the storage space between an upright position in which the divider separates the storage space into a front storage section and a rear storage section and a recumbent position that facilitates access to the rear storage section; and
   a motion detector module attached to the divider, the motion detector module including a sensor for detecting pivoting of the divider from the upright position to the recumbent position, and a radio frequency transmitter in communication with the sensor and configured to emit radio frequency signals when the divider is rotated from the upright position to the recumbent position.

2. The inventory management system of claim 1, further comprising a consolidator including a radio frequency receiver for detecting a signal from the transmitter of the motion detector module and a processor for communicating restocking information to fill or generate a restocking order.

3. The inventory management system of claim 1, wherein the motion detector module further comprises at least one battery for powering the sensor and radio frequency transmitter.

4. The inventory management system of claim 3, wherein the motion detector module further comprises a circuit substrate on which electrical components are mounted, said electrical components including the sensor and the radio frequency transmitter, and an actuator button for turning on power to the electrical components mounted on the circuit substrate.

5. The inventory management system of claim 4, further comprising a housing containing the circuit substrate, an LED mounted on the circuit substrate, and a light pipe extending from the LED and through an aperture of the housing for propagating light from the LED to a front face of the module housing to indicate a condition of the module.

6. The inventory management system of claim 5, wherein the housing includes a tab projecting from an upper surface of the housing for engaging a return leg on an upper horizontal ledge portion projecting from a vertical portion of a divider.

7. The inventory management system of claim 5, wherein the housing includes a clip having a base portion that is configured for engaging a first face of a divider and a cantilevered portion for engaging a second face of the divider opposite the first face.

8. The inventory management system of claim 1, wherein the sensor is a Hall-effect sensor.

9. The inventory management system of claim 1, wherein the sensor is a reed switch.

10. The inventory management system of claim 1, wherein the sensor is an optical sensor.

11. The inventory management system of claim 1, wherein the sensor is a mercury switch.

12. The inventory management system of claim 1, wherein the sensor is a rolling ball sensor switch.

13. The inventory management system of claim 1, wherein the sensor is a gyroscopic sensor.

14. A method of generating a restocking order for a storage space, comprising:
   providing a storage space and a divider pivotable between an upright position that divides the storage space into a front storage section and a rear storage section and a recumbent position that facilitate access to the rear storage section; and
   providing a motion detection module on the pivotable divider, the motion detection module including a sensor for detecting pivoting of the divider from the upright position to the recumbent position, and a radio frequency transmitter in electrical communication with the sensor to transmit a radio frequency signal when the divider is pivoted from the upright position to the recumbent position.

15. An inventory management system, comprising:
   a storage space including a floor having an area for storage of inventory;
   a divider pivotable around an axis on the floor of the storage space between an upright position in which the divider separates the floor area into a front storage section and a rear storage section, and a recumbent position that facilitates access to the rear storage section; and
   a motion detector module attached to the divider, the motion detector module including a sensor for detecting pivoting of the divider, and a radio frequency transmitter in communication with the sensor and configured to emit radio frequency signals when the divider is pivoted.

16. The inventory management system of claim 15, wherein the sensor is a Hall-effect sensor.

17. The inventory management system of claim 15, wherein the sensor is a reed switch.

18. The inventory management system of claim 15, wherein the sensor is an optical sensor.

19. The inventory management system of claim 15, wherein the sensor is a mercury switch.

20. The inventory management system of claim 15, wherein the sensor is a rolling ball sensor switch.

21. The inventory management system of claim 15, wherein the sensor is a gyroscopic sensor.

\* \* \* \* \*